Aug. 19, 1941.  J. H. BLANKENBUEHLER  2,253,321
ARC WELDING SYSTEM
Filed June 24, 1938  3 Sheets-Sheet 1

WITNESSES:

INVENTOR
John H. Blankenbuehler.
BY
ATTORNEY

Aug. 19, 1941.   J. H. BLANKENBUEHLER   2,253,321
ARC WELDING SYSTEM
Filed June 24, 1938   3 Sheets-Sheet 2

WITNESSES:

INVENTOR
John H. Blankenbuehler.
BY
ATTORNEY

Aug. 19, 1941.   J. H. BLANKENBUEHLER   2,253,321
ARC WELDING SYSTEM
Filed June 24, 1938   3 Sheets-Sheet 3

WITNESSES:
E. F. Oberheim
G. V. Giolma

INVENTOR
John H. Blankenbuehler.
BY G. M. Crawford
ATTORNEY

Patented Aug. 19, 1941

2,253,321

UNITED STATES PATENT OFFICE 2,253,321

ARC WELDING SYSTEM

John H. Blankenbuehler, Edgewood, Pa., assignor to Westinghouse Electric & Manufacturing Company, East Pittsburgh, Pa., a corporation of Pennsylvania Application June 24, 1938, Serial No. 215,519

10 Claims. (Cl. 219—8)

My invention relates, generally, to arc welding systems, and more particularly to an automatic arc welding system for use in welding with alternating current.

The object of my invention, generally stated, is to provide in a simple and effective manner for automatically feeding a fusible electrode in an automatic alternating-current arc welding system.

A more specific object of my invention is to utilize rectifier means for controlling the operation of a direct-current feed motor for automatically feeding a fusible electrode in an alternating-current arc welding system.

A further object of my invention is to provide for controlling a direct-current electrode feed motor in an automatic welding system in accordance with variations of an alternating-current arc.

A further object of my invention is to provide, in an automatic alternating-current arc welding system, for controlling the value and direction of potential applied to the armature of a direct-current electrode feed motor so as to effect feed of the electrode in accordance with variations in the alternating-current arc voltage and maintain the electrode in a predetermined operating relation with work upon which a welding operation is being performed.

Other objects will, in part, be obvious, and will, in part, appear hereinafter.

In practicing my invention, rectifying means may be connected to an alternating-current welding circuit for providing a direct-current potential proportional to the voltage between a fusible electrode and work upon which a welding operation is being performed, which potential may then be applied to a control circuit for controlling the excitation of a direct-current electrode feed motor, so as to feed the electrode in such a manner as to maintain it in a predetermined relation with the work.

For a more complete understanding of the nature and scope of my invention, reference may be had to the following detailed description, taken in connection with the accompanying drawings, in which.

Figure 1:
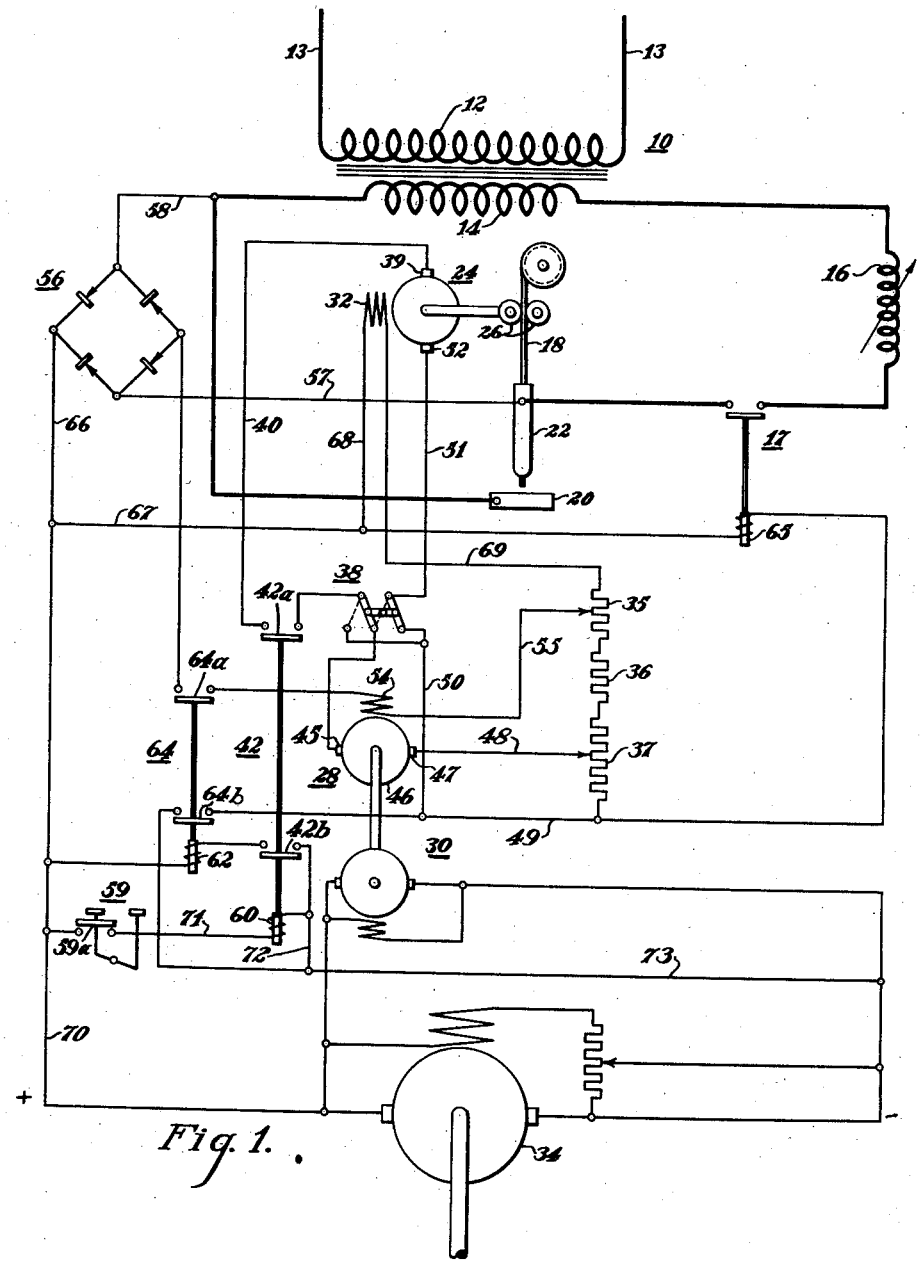
Figure 1 illustrates diagrammatically an automatic arc welding system embodying a preferred form of my invention.

Referring specifically to Figure 1, the reference numeral 10 may denote generally a transformer having a primary winding 12 connected to a suitable source of alternating current 13, and a secondary winding 14, which may be connected by means of variable reactance device 16, of suitable nature for controlling the output of the transformer, and a switch device 17, to a welding circuit comprising a fusible electrode 18, work 20 upon which a welding operation is to be performed, and a nozzle 22 for guiding the electrode 18 and providing sufficient contact surface for the conduction of the welding current thereto.

In order to feed the fusible electrode 18 relative to the work 20, a direct current feed motor 24 may be operatively connected with feed rolls 26, which are disposed in engagement with the electrode 18 in any well known manner. Operation of the feed motor 24 may be effected by connecting it for energization from control generator 28, which may be driven by a motor 30, and controlling the output of the generator 28 so as to effect the desired rate of feed of the electrode 18. For example, the shunt field winding 32 of the feed motor 24 may be connected to a suitable source of excitation, such as the generator 34, in series circuit relation with suitable control resistors 35, 36 and 37, so as to provide a substantially constant field flux, while the armature of the feed motor 24 is connected in series circuit relation with the armature of the control generator 28, and in shunt circuit relation with the control resistor 37.

A reversing switch 38 may be provided for reversing the terminal connections between the feed motor and control generator armatures when desired. The energizing circuit for the armature of the feed motor 24 may be traced from brush 39 of the feed motor 24, through conductor 40, the normally open contact members 42a of the control relay 42 which controls energization of the feed motor armature, reversing switch 38, brush 45 of the control generator, armature 46, brush 47, conductor 48, control resistor 37, conductor 49, conductor 50, reversing switch 38, and conductor 51 to the armature brush 52 of the feed motor 24. Thus the armature of the feed motor 24 may be connected to the armature of the control generator 28 so as to be energized therefrom and at the same time it may be so associated with the constant potential source 34 through the control resistor 37, that when the output of the control generator 28 is reduced to a zero value an exciting current will be supplied to the armature of the feed motor 24 by the potential drop across the control resistor 37 for effecting operation of the feed motor 24 to suitably retract the electrode 18 from the work 20.

Forward feed of the electrode 18 may be effected by connection of the shunt field winding 54 of the control generator 28 to form a bridging connection in a Wheatstone bridge circuit, comprising the control resistors 35, 36 and 37, and the direct current terminals of suitable rectifier means such as the rectifier circuit 56, which may comprise a bridge connection of copper oxide rectifying units or the like, the alternating current terminals of which are connected in shunt relation with the arc by conductors 57 and 58, connected to the electrode and to the work, respectively.

By associating the direct-current terminals of the rectifier circuit 56, the shunt field winding 54 and the control resistor 35, so that the potentials of the rectifier circuit 56 and of the control resistor are in opposed relation, with the field winding 54 disposed in bridged connection thereacross, the direction and value of the potential applied to the winding 54 may be caused to vary in accordance with conditions in the bridge circuit, and the field excitation of the control generator 28 may thus be effectively varied in accordance with fluctuations in the voltage existing between the electrode 18 and the work 20, to suitably control the feed of the electrode 18 and maintain a predetermined relationship between the electrode and the work.

So that the operator may properly control the operation of the welding system, a suitable push-button device 59 may be provided for controlling the energization of the operating coil 60 of the control relay 42. The control relay 42 may then complete an energizing circuit through contact member 42b for the operating coil 62 of a switching relay 64, which is provided for controlling the operation of the line switch 17 and the energization of the control generator field winding 54.

When the terminal voltage of the welding transformer 10 is applied across the alternating-current terminals of the rectifier circuit 56 by the operation of the line switch 17, a corresponding direct-current voltage is impressed across the bridge connection of the shunt field winding 54 of the control generator 28, sufficient to overcome the opposed potential of the control resistor 35. An excitation current will then flow in the field winding 54 and the control generator 28 may then generate a potential sufficient to overcome the bias potential of the control resistor 37, and determine the direction of flow of current in the series circuit connection of the feed motor armature and the control generator armature. The feed motor 24 will then feed the electrode 18 towards the work 20. The circuit of the field winding 54 may be traced from one terminal of the rectifier circuit 56, through conductors 66, 67 and 68, field winding 32, conductor 69, control resistor 35, conductor 55, of the control generator field winding 54 and contact members 64a to the opposite terminal of the rectifier circuit 56. As the resistance of the rectifier device 56 is exceedingly high in the reverse direction, the field winding 54 will be energized only when the potential across the rectifier circuit 56 exceeds the potential across the field winding 32 and the portion of the control resistor 35 which is in the above described bridge circuit connection of the field winding 54.

Upon engagement of the electrode 18 with the work, the alternating-current voltage therebetween will be reduced to zero, so that the corresponding direct-current voltage applied to the shunt field winding 54 of the control generator by the rectifier circuit 56 will likewise be reduced and the current through the winding 54 will be negligible. The bias voltage of the control resistor 37 becomes effective to determine the direction of current flow in the feed motor armature circuit, causing the feed motor to reverse, separating the electrode 18 from the work 20, and drawing an arc. The alternating-current arc voltage between the electrode and the work is thereby increased, and likewise the direct-current voltage impressed by the rectifier circuit 56 upon the shunt field winding 54 of the control generator.

By suitably providing for adjusting of the respective connections between the control resistor 35 and the shunt field winding 54, and control resistor 37 and the series circuit connection of the armatures of the feed motor 24 and of control generator 28, it will be seen the potentials applied to the field winding 54 and the feed motor armature circuit may be varied as desired, and the system herein described may be effective to maintain an alternating-current arc between the electrode 18 and the work 20 of any suitable predetermined nature.

The operation of the system may be described as follows: Upon closure of the normally open contact members 59a of the push-button device 59, the control relay 42 is actuated by energization of its operating coil 60 through the circuit extending from generator 34, through conductor 70, contact members 59a, conductor 71, operating coil 60, conductor 72 and conductor 73 back to generator 34. The operating coil 62 of the switching relay 64 will then be connected across the source 34, through the closure of contact members 42b, and at the same time the armature of the feed motor 24 will be connected in series circuit relation with the armature of the control generator 28 through closure of contact members 42a. Operation of the switching relay 64 connects the rectifier circuit 56 to the shunt field winding 54 of the control generator, through contact members 64a, and at the same time contact members 64b connect the operating coil 65 of the line switch 17 to the source 34.

In response to the closure of the line switch 17 the alternating current voltage of the welding circuit is impressed upon the rectifier circuit 56 and a corresponding direct current potential is applied across the bridge connection of field winding 54 of the control generator 28. The feed motor 24 is then energized to feed the electrode 18 toward the work 20 to strike an arc therebetween and maintain it as hereinbefore described.

Figure 2:
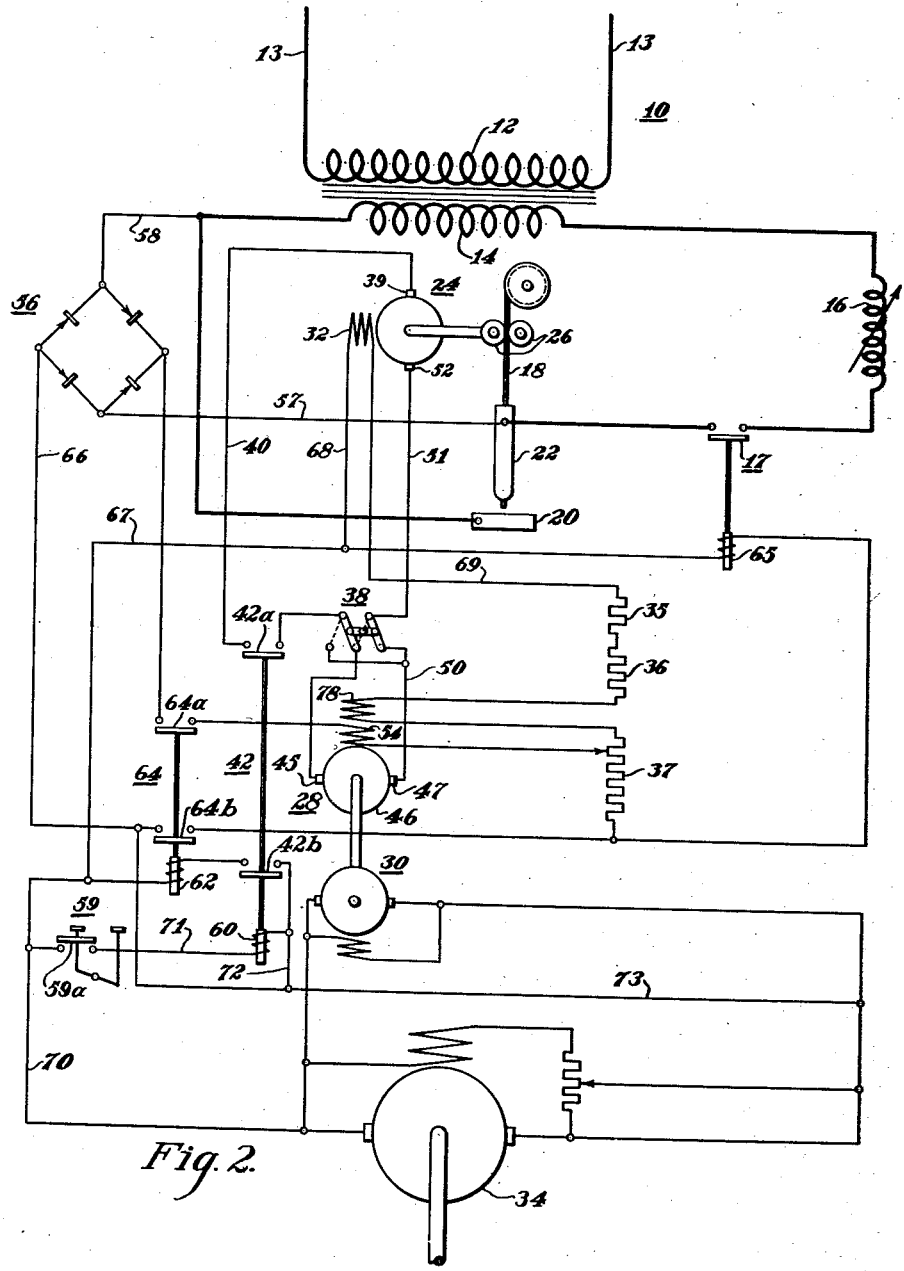
Fig. 2 illustrates diagrammatically the application of an alternative form of my invention in a welding system.

The welding system of Fig. 2 operates in substantially the same manner as the system hereinbefore described in connection with Fig. 1, except that in this embodiment the armature of the feed motor 24 is directly connected through the reversing switch 38 with the armature of the control generator 28, and instead of applying a bias excitation potential to the armature circuit of the feed motor for effecting reversal thereof as in the system of Fig. 1, the control generator 28 may be provided with an auxiliary bias field winding 78 which is connected to a substantially constant potential source of excitation for effecting energization of the feed motor to retract the electrode from the work. For example, the auxiliary field winding 78 may be connected in series circuit relation with the control resistor 35, 36 and 37 across the terminals of the constant potential source 34, while the field winding 54 is connected in a bridge circuit connection with the rectifier circuit 56, as hereinbefore described. By suitably determining the direction and amount of excitation of the auxiliary field winding 78, the output of the control generator 28 may be so proportioned that when the alternating-current arc voltage between the electrode 18 and the work 20 is reduced to zero, a sufficient potential to be applied to the armature of the feed motor 24 to effect retraction of the electrode to strike the arc. By properly proportioning the excitation potential applied to the main field winding 54 of the control generator 28, as a result of the differential action between the rectifier circuit 56 and the control resistor 37, they being connected in opposition thereto as in Fig. 1, it may be seen that the system is operable to effect operation of the feed motor 24 to maintain any desirable predetermined alternating-current arc conditions between the electrode 18 and the work 20, as in the manner hereinbefore described in connection with the welding system disclosed in Fig. 1.

Figure 3:
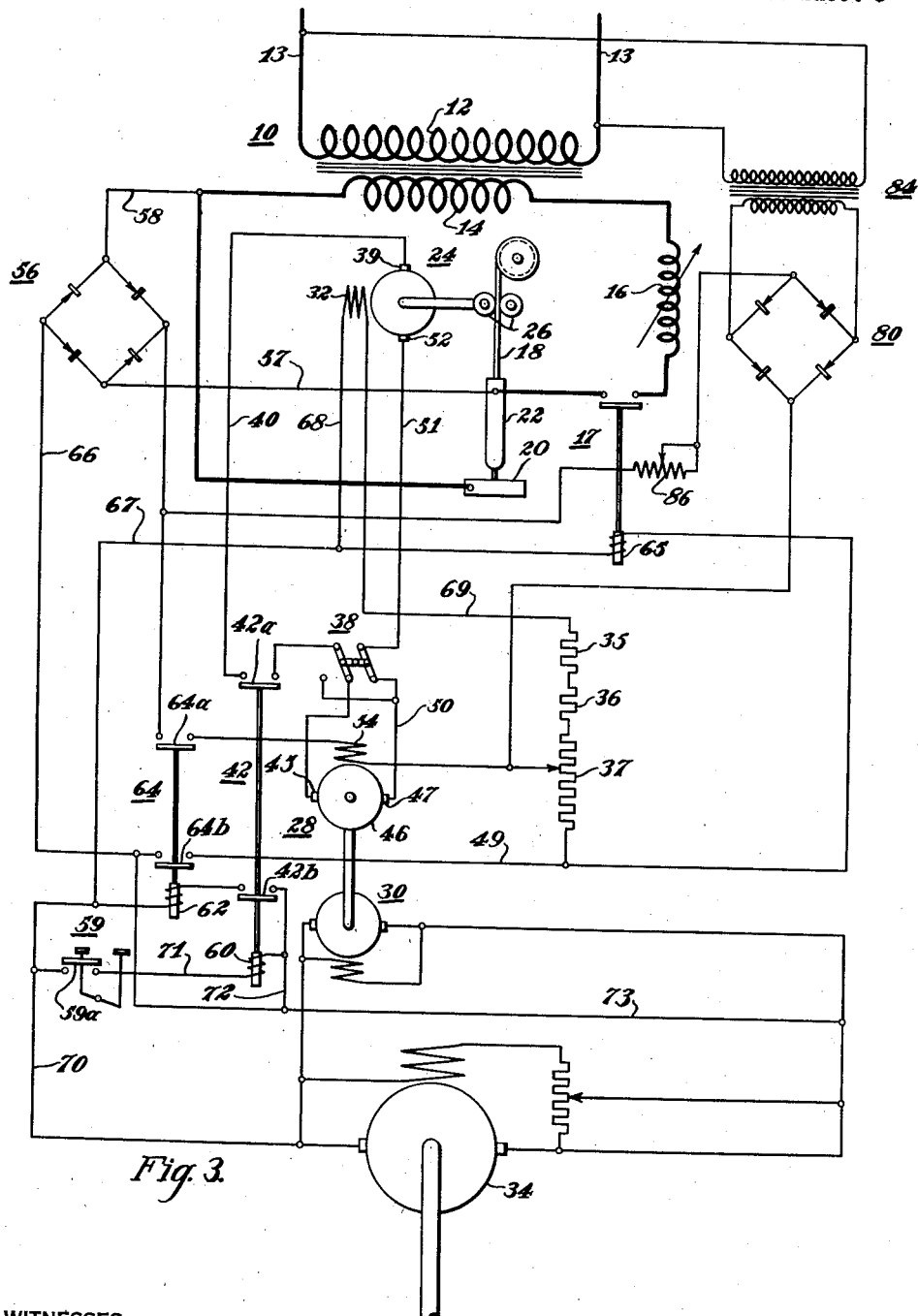
Fig. 3 is a schematic diagram of a further modification of the invention.

In a further modification of my invention, as disclosed in Fig. 3, an additional rectifier device 80 of suitable nature may be provided, having the alternating-current terminals thereof connected to a source of alternating current, such as the auxiliary transformer 84, and having the direct current terminals thereof connected in series circuit relation with the terminals of the rectifier circuit 56, a variable control resistor 86 and the resistor 37. By connecting the rectifier circuits 56 and 80 in additive relation to oppose the potential of the control resistor 37 and connecting the generator field winding 54 in bridged relation therewith, it is possible to apply a differential excitation potential to the shunt field winding 54 of the control generator 28 in such a direction and of such a value as to control the feed motor 24 to feed the electrode 18 toward the work and effect a withdrawal thereof immediately upon its engagement with the work, so as to strike an arc and to thereafter maintain the electrode in a suitable operating relation with the work controlling the rate of feed in accordance with variations in the arc voltage between the electrode and the work in substantially the same manner as described in detail in connection with Fig. 1.

It may, therefore, be seen that in my invention I have provided a simple and effective system for controlling a direct current feed motor in accordance with the arc conditions in an alternating current arc welding system. My invention may be advantageously used in connection with direct current arc welding systems which use a direct current feed motor, and with which it is found desirable to use alternating current in the welding circuit. The changes involved may be quickly and easily made, and are inexpensive to perform. It requires no complicated mechanism with delicate moving parts which get out of order and neither are there any expensive wearing parts to replace. The resultant system is both efficient in operation and serviceable, and combines the advantages of the alternating current arc with the desirability of a direct current electrode feed.

Since certain changes may be made in the above description, and different embodiments of the invention may be made without departing from the spirit thereof, it is intended that all matter contained in the above description, or shown in the accompanying drawings, shall be considered as illustrative, and not in a limiting sense.

I claim as my invention:

1. In a welding system having an alternating current welding circuit, a direct current feed motor for maintaining an electrode in operating relation with the work having armature and field windings, circuit means for providing a substantially constant control voltage to effect energization of one of the said windings, additional circuit means for producing a substantially constant control voltage for effecting energization of the other of said windings for operating the feed motor to retract the electrode from the work, and circuit means including a rectifier device associated in connection with the welding circuit for producing an opposing variable control voltage for effecting energization of said other winding so as to control the direction and speed of operation of the feed motor in response to conditions in the welding circuit.

2. An automatic alternating current arc welding system comprising, a reversible direct current feed motor having a field winding and an armature connected in driving relation with an electrode for feeding it relative to the work, circuit means for effecting energization of the field winding, means for applying a substantially constant voltage to the armature to operate the feed motor in one direction, and control means including a unidirectional current device for applying an opposing control voltage to the armature to vary both the rate and direction of operation of the feed motor in accordance with an arc characteristic.

3. A control system for an automatic alternating current arc welding system comprising, a direct current feed motor for feeding an electrode relative to the work having an armature and a separately excited field winding, circuit means for effecting the energization of the armature from a source of substantially constant voltage so as to operate the feed motor to feed the electrode in one direction, and control means including a rectifier device for rectifying the alternating current arc voltage to effect operation of the feed motor in the other direction so as to control the feed of the electrode in accordance with the arc characteristic.

4. An automatic alternating current arc welding system comprising, a direct current feed motor for maintaining an electrode in operating relation with the work having an armature and a field winding connected to a constant voltage source, circuit means for supplying a substantially constant control voltage to the armature for effecting operation of the feed motor to withdraw the electrode from the work, and means including a rectifier device for imposing on the control voltage an opposing variable control voltage responsive to the alternating current arc voltage for effecting operation of the feed motor in the reverse direction for feeding the electrode to maintain it in predetermined operating relation with the work.

5. An automatic arc welding system comprising, a welding circuit including a fusible electrode and work upon which a welding operation is to be performed, said welding circuit being connected to a source of alternating current for maintaining an alternating current arc between the electrode and the work, a direct current feed motor connected in driving relation with the electrode for feeding it relative to the work, means including a control generator for applying a substantially constant voltage to the armature of the feed motor for operating the motor to feed the electrode away from the work to feed the electrode away from the work, circuit means for exciting the control generator to apply an opposing voltage to the armature of the feed motor for feeding the electrode toward the work, and control means including a rectifying device connected with the welding circuit for controlling the circuit means to effect feed of the electrode in accordance with variations in the arc conditions.

6. An automatic alternating current arc welding system comprising, a reversible direct current feed motor having an armature and a field winding for effecting motion of an electrode relative to the work, circuit means for applying a substantially constant control voltage to the motor field winding, an auxiliary source of direct current for effecting energization of the feed motor armature to retract the electrode from the work at a predetermined rate, a control generator connected in opposition to the auxiliary source, and means including a rectifier device associated with the arc for controlling the excitation of the control generator to effect operation of the feed motor in accordance with variations in the arc characteristics.

7. The combination in an automatic arc welding system utilizing a source of alternating current of a direct current feed motor for feeding an electrode relative to work having a field winding and an armature winding, a control generator provided with a field winding for effecting energization of the feed motor armature winding, control means including a rectifier device for providing an excitation potential proportional to the alternating-current arc voltage, an auxiliary source of substantially constant voltage opposed thereto, and circuit means for associating the control means, auxiliary source, and generator field winding in a Wheatstone bridge circuit for controlling the energization of the armature winding of the feed motor in accordance with an arc characteristic.

8. An automatic alternating-current arc welding system comprising, an alternating current welding circuit including a fusible electrode and work upon which a welding operation is to be performed, a direct-current feed motor having a separately excited field winding and an armature connected for feeding the electrode relative to the work, a control generator having a separately excited winding and an armature for supplying current to the armature of the feed motor for effecting feed of the electrode, circuit means for producing a substantially constant direct current voltage, rectifier means for producing an opposing variable direct current voltage responsive to the voltage of the welding circuit, and circuit means for applying the differential between said voltages to the field winding of the control generator for effecting operation of the feed motor to maintain a predetermined arc condition.

9. An automatic alternating current arc welding system comprising, a direct current feed motor for feeding an electrode relative to the work having an armature and a field winding, a generator for controlling operation of the feed motor having a plurality of field windings, circuit means for applying a substantially constant excitation voltage to one of the field windings of the generator to cause said generator to control the feed motor to retract the electrode from the work, and control means including a rectifier device for applying a direct-current excitation voltage to another of the generator windings proportional to the arc voltage for causing said generator to control the feed motor to effect feed of the electrode towards the work and maintain it in operating relation thereto.

10. An automatic arc welding system comprising, an alternating current welding circuit including a fusible electrode and work upon which a welding operation is to be performed, a reversible direct-current feed motor connected in driving relation with the electrode for feeding it relative to the work, a control generator connected to supply electrical energy to the feed motor having a field winding, an excitation circuit for said field winding including means for producing therein a substantially constant bias voltage for effecting operation of the feed motor to retract the electrode from the work, and control means including a rectifier device associating the welding circuit and the excitation circuit for producing therein a variable voltage responsive to the voltage of the welding circuit in opposition to the bias voltage for controlling feed of the electrode to maintain a predetermined arc condition.

JOHN H. BLANKENBUEHLER.